United States Patent
Yang et al.

(10) Patent No.: US 9,256,331 B2
(45) Date of Patent: Feb. 9, 2016

(54) TOUCH PANEL

(71) Applicant: HTC Corporation, Taoyuan County (TW)

(72) Inventors: Tun-Chun Yang, Taoyuan County (TW); Chih-Jen Hu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 71 days.

(21) Appl. No.: 13/942,718

(22) Filed: Jul. 16, 2013

(65) Prior Publication Data

US 2015/0022728 A1    Jan. 22, 2015

(51) Int. Cl.
*G06F 3/044* (2006.01)

(52) U.S. Cl.
CPC ...... *G06F 3/044* (2013.01); *G06F 2203/04111* (2013.01); *G06F 2203/04112* (2013.01)

(58) Field of Classification Search
None
See application file for complete search history.

(56) References Cited

U.S. PATENT DOCUMENTS

| | | | |
|---|---|---|---|
| 2009/0102995 A1* | 4/2009 | Kim et al. | 349/40 |
| 2010/0171149 A1 | 7/2010 | Denison et al. | |
| 2010/0320009 A1 | 12/2010 | Kuo et al. | |
| 2013/0335099 A1* | 12/2013 | Di Sarro et al. | 324/537 |

FOREIGN PATENT DOCUMENTS

| | | |
|---|---|---|
| CN | 102760010 | 10/2012 |
| CN | 102830881 | 12/2012 |
| TW | 563014 | 11/2003 |
| TW | 201109771 | 3/2011 |
| TW | 201122637 | 7/2011 |
| TW | M434256 | 7/2012 |
| TW | 201327312 | 7/2013 |

OTHER PUBLICATIONS

"Office Action of Taiwan Counterpart Application," issued on May 15, 2015, p. 1-p. 10.

* cited by examiner

*Primary Examiner* — Kenneth B Lee, Jr.
(74) *Attorney, Agent, or Firm* — Jianq Chyun IP Office

(57) ABSTRACT

A touch panel including a substrate, a touch sensing array, connecting lines, extending portions, a first electrostatic discharge protection circuit, and a second electrostatic discharge protection circuit is provided. The substrate has an active region and a periphery region. The touch sensing array is disposed in the active region. The connecting lines and extending portions are disposed in the periphery region. An end of each of the connecting lines is respectively connected to the touch sensing array by the corresponding extending portion. The first electrostatic discharge protection circuit is disposed in the periphery region and located between the outermost connecting line and the edge of the corresponding substrate. The second electrostatic discharge protection circuit is disposed in the periphery region and located between the innermost connecting line and the touch sensing array. The second electrostatic discharge protection circuit overlaps with the extending portions on the substrate.

10 Claims, 5 Drawing Sheets

TOUCH PANEL

BACKGROUND OF THE INVENTION

1. Field of the Invention

The application relates to a touch panel, and more particularly to a touch panel having electro-static discharge protection.

2. Description of Related Art

In the past few years, with rapid development and application in information technology, wireless mobile communication, and information appliance, conventional input devices such as a keyboard or mouse for a lot of information products are now replaced by a touch panel as an input device for the products to be easier to use, more compact, and more human.

A touch panel can be roughly categorized into a resistive touch panel, a capacitive touch panel, an optical touch panel, a surface acoustic wave touch panel, and an electromagnetic touch panel based on the way it senses. Compared with other types of touch panels, the capacitive touch panel has the advantages of short response time, favorable reliability, high definition, etc. and is therefore widely used in various types of handheld electronic apparatus.

Generally, damages caused by the electrostatic discharge (ESD) possibly happen to an electronic product at any time when the electronic product is manufactured, packaged, tested, delivered, even finally shipped and used, which leads to high risk of malfunction. The touch panel is also likely to be damaged by electrostatic discharge. Therefore, an ESD protection circuit is usually made for the touch panel for protection. Nevertheless, the width of the ESD protection circuit causes the border size of the touch panel to be increased, which does not meet the requirement that current electronic products tend to be designed with small sizes.

SUMMARY OF THE INVENTION

The application provides a touch panel which may effectively decrease or even save the space initially taken by an electrostatic discharge (ESD) circuit on the border, which is advantageous for the design of a slim border.

In the application, the touch panel includes a substrate, a touch sensing array, a plurality of connecting lines, a plurality of extending portions, a first electrostatic discharge protection circuit, and a second electrostatic discharge protection circuit. The substrate has an active region and a periphery region. The touch sensing array is disposed in the active region. The connecting lines and extending portions are disposed in the periphery region. An end of each of the connecting lines is respectively connected to the touch sensing array by corresponding extending portions. The first electrostatic discharge protection circuit is disposed in the periphery region and located between the outermost connecting line and the edge of the corresponding substrate. The second electrostatic discharge protection circuit is disposed in the periphery region and located between the innermost connecting line and the touch sensing array. The second electrostatic discharge protection circuit overlaps with the extending portions on the substrate.

Based on the above, in the application, the touch panel includes two electrostatic discharge protection circuits. With the design of two electrostatic discharge protection circuits, the width of each electrostatic discharge protection circuit is respectively decreased such that the border size of the touch panel is effectively reduced while the electrostatic discharge protection for the touch panel is maintained. In addition, the application further allows one of the second electrostatic discharge protection circuits for the touch panel to overlap with the extending portion on the substrate so that the space initially taken by the extending portions on the substrate can be effectively used.

In order to make the aforementioned features and advantages of the invention more comprehensible, embodiments accompanying figures are described in detail below.

DESCRIPTION OF EMBODIMENTS

Figure 1:
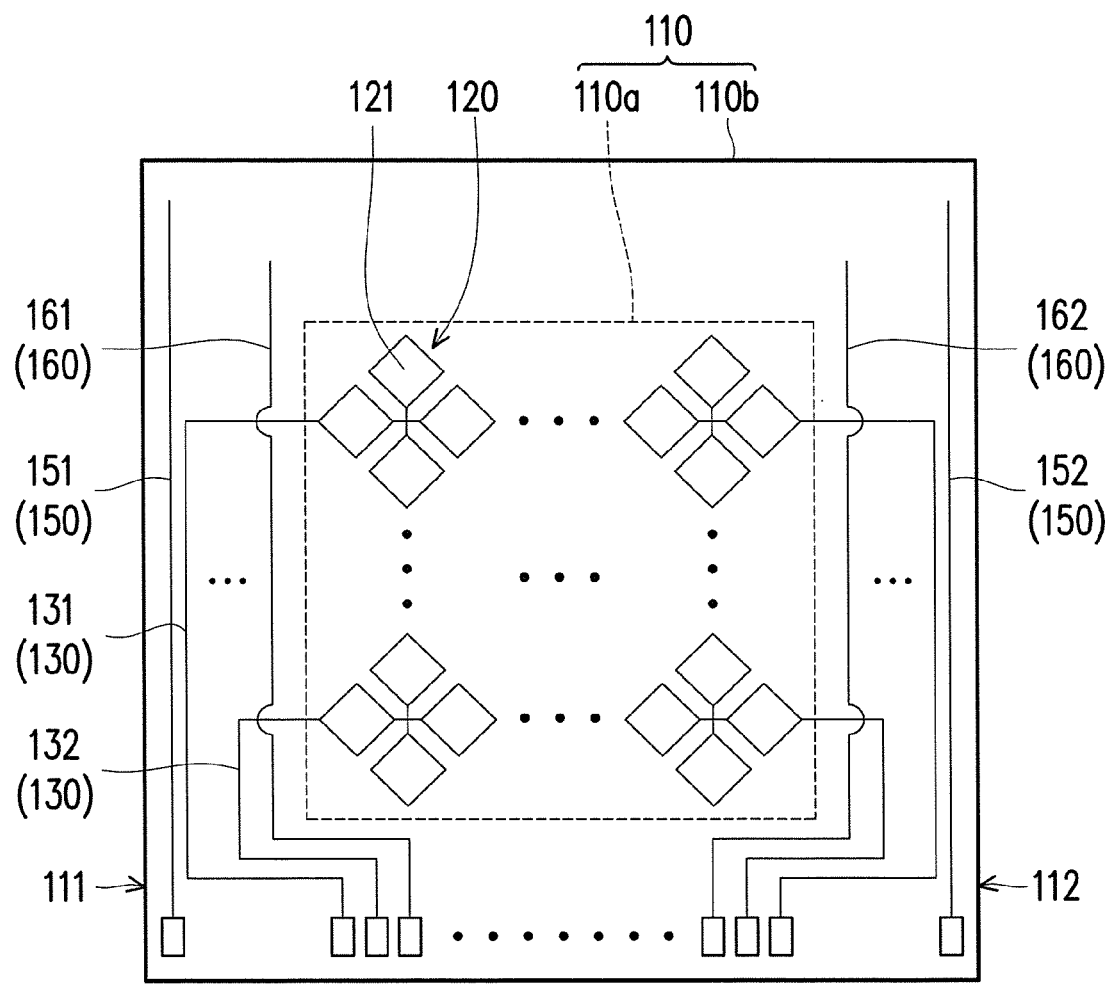
FIG. 1 is a schematic view illustrating a touch panel according to an embodiment of the invention.
Figure 2:
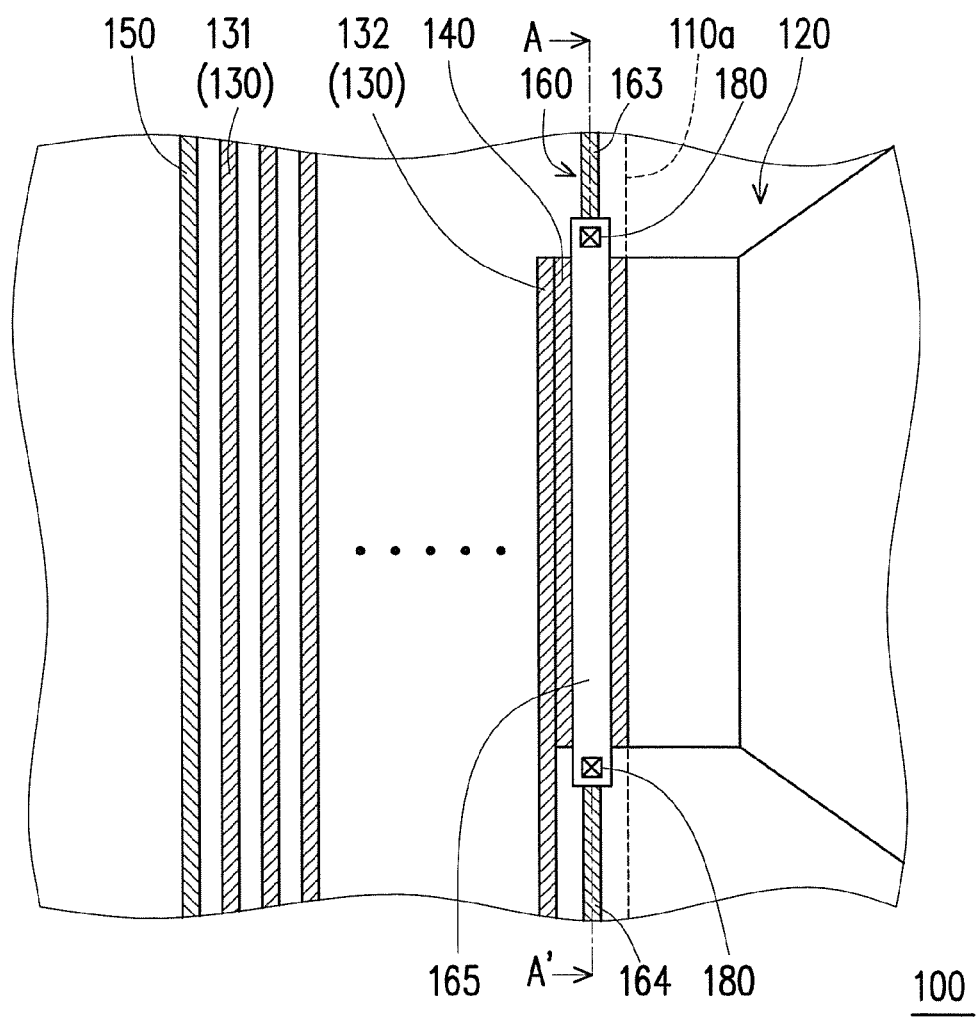
FIG. 2 is a schematic view illustrating local enlargement of the touch panel in FIG. 1.

FIG. 1 is a schematic view illustrating a touch panel according to an embodiment of the invention. FIG. 2 is a schematic view illustrating local enlargement of the touch panel in FIG. 1. Please refer to both FIGS. 1 and 2. A touch panel 100 includes a substrate 110, a touch sensing array 120, a plurality of connecting lines 130, a plurality of extending portions 140, a first electrostatic discharge protection circuit 150 and a second electrostatic discharge protection circuit 160. The substrate 110 is, for example, a glass substrate or a plastic substrate. The substrate 110 has an active region 110a and a periphery region 110b. The touch sensing array 120 is disposed in the active region 110a. The connecting lines 130 and extending portions 140 are disposed in the periphery region 110b. As shown in FIG. 1, in the embodiment, the extending portions 140 are arranged around the active region 110a, wherein an end of each of the connecting lines 130 is respectively connected to the touch sensing array 120 via the corresponding extending portion 140. The first electrostatic discharge protection circuit 150 is disposed in the periphery region 110b and located between the outermost connecting line 131 and the edge of the corresponding substrate 110. The second electrostatic discharge protection circuit 160 is disposed in the periphery region 110b and located between the innermost connecting line 130 and the touch sensing array 120. As shown in FIG. 2, the second electrostatic discharge protection circuit 160 overlaps with the extending portions 140 on the substrate 110.

In the embodiment, a side of the touch panel 100 includes two electrostatic discharge protection circuits 150 and 160. With the design of two electrostatic discharge protection circuits, the width of each electrostatic discharge protection circuit 150 and 160 is respectively decreased such that the border size of the touch panel 100 is effectively reduced while the electrostatic discharge protection for the touch panel 100 is maintained. Specifically, with the design of one electrostatic discharge protection circuit, the issue of impedance needs to be taken into consideration, and therefore a minimum width is set to the electrostatic discharge protection circuit. When the touch panel is designed to have two electrostatic discharge protection circuits, the width of each electrostatic discharge protection circuit is respectively reduced while the total width remains to be the same. In addition, in the embodiment, the second electrostatic discharge protection circuit 160 overlaps with the extending portions 140 on the substrate 110. The overlapped portion may further allow the border size of the touch panel 100 to be reduced. In other words, in the embodiment, by overlapping the second electrostatic discharge protection circuit 160 with the extending portions 140, the space initially taken by the extending portions 140 on the substrate 110 can be effectively used.

Figure 3:
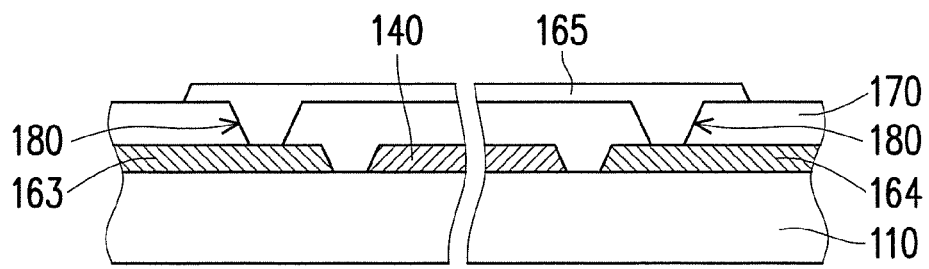
FIG. 3 is a cross-sectional view along A-A' line in FIG. 2.

FIG. 3 is a cross-sectional schematic view along A-A' line in FIG. 1. Please refer to both FIGS. 2 and 3. The second electrostatic discharge protection circuit 160 includes a first segment 163, a second segment 164, and a third segment 165 located between the first segment 163 and the second segment 164. Additionally, the touch panel 100 further includes an insulating layer 170 covering the connecting lines 130, the first segment 163 and the second segment 164 of the second electrostatic discharge protection circuit 160, and the extending portions 140. As shown in FIG. 3, the third segment 165 is disposed on the insulating layer 170 and coupled downward to the first segment 163 and the second segment 164 via two contact windows 180 within the insulating layer 170.

Furthermore, in the embodiment, the connecting lines 130, the first segment 163 and the second segment 164 of the second electrostatic discharge protection circuit 160, and the extending portions 140 are all formed of the same metal layer. The third segment 165 and at least a portion of the touch sensing array 120 is formed of the same transparent conductive material layer such as a material layer formed of indium tin oxide (ITO) or indium zinc oxide (IZO).

In other words, in the embodiment, each segment of the second electrostatic discharge protection circuit 160 is located at different layers. To be precise, the first segment 163 and the second segment 164 are located at the same layer and may be located at the same layer as the connecting lines 130 and the extending portions 140. The third segment 165 is located at another layer independently. Additionally, the insulating layer 170 is located between the layers where the first segment 163, the second segment 164, and the third segment 165 are located at. Besides, the third segment 165 of the second electrostatic discharge protection circuit 160 is electrically connected to the first segment 163 and the second segment 164 of the second electrostatic discharge protection circuit 160 via the contact windows 180.

Moreover, since the first segment 163 and the second segment 164 are located at the same layer and may be located at the same layer as the connecting lines 130 and the extending portions 140, the connecting lines 130, the first segment 163 and the second segment 164 of the second electrostatic discharge protection circuit 160, and the extending portions 140 may be formed of the same metal layer.

Please refer to FIG. 1. It needs to be indicated that the touch sensing array 120 of the touch panel 100 includes a plurality of touch sensing patterns 121. Meanwhile, the touch sensing array 120 may be a single-layered structure or a double-layered structure. The touch sensing patterns 121 of the touch sensing array 120 may be designed to be coplanar or non-coplanar. The pattern of the touch sensing array 120 is not limited to a diamond pattern, it may be in a striped shape or other shapes. Moreover, in the embodiment, the first electrostatic discharge protection circuit 150 includes two first electrostatic discharge protection circuits 151 and 152 located at two opposite sides 111 and 112 of the substrate; the second electrostatic discharge protection circuit 160 includes two second electrostatic discharge protection circuits 161 and 162 located at two opposite sides of the active region 110a, such that the electrostatic discharge protection for the touch panel 100 may be adjusted. Also, with the design of the first electrostatic discharge protection circuit 151 and the second electrostatic discharge protection circuit 161 as well as the design of the first electrostatic discharge protection circuit 152 and the second electrostatic discharge protection circuit 162, the border size of the touch panel 100 is reduced. In the embodiment, the electrostatic discharge protection circuits are not electrically connected to one another; however, in other embodiments, the electrostatic discharge protection circuits may be electrically connected to one another so that the electrostatic discharge protection can be adjusted.

In the following embodiments, the reference numbers and a part of the content recited in the previous embodiments are adopted, wherein same reference numbers are adopted to refer to identical or similar elements and the descriptions for identical technical content is omitted. With regard to the omitted descriptions, please refer to the previous embodiments. The same descriptions are not repeated herein.

Figure 4:
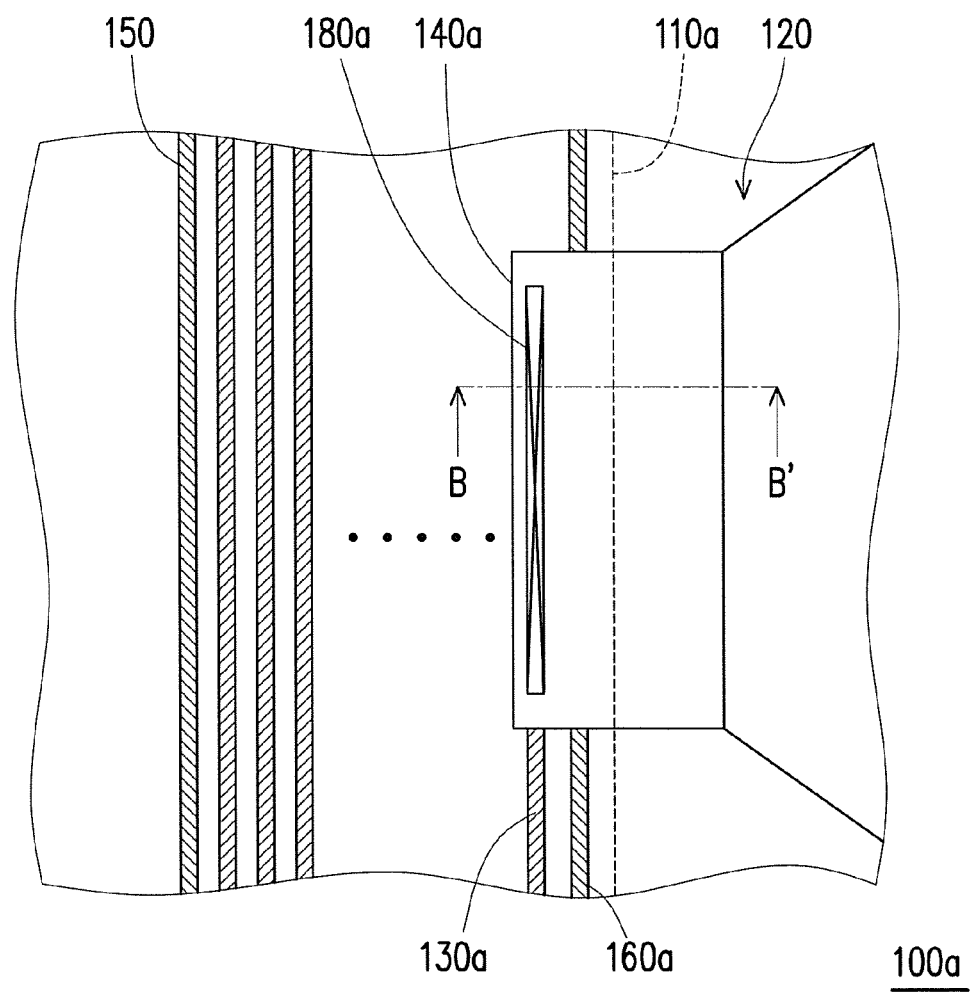
FIG. 4 is a schematic view illustrating local enlargement of a touch panel in another embodiment of the invention.
Figure 5:
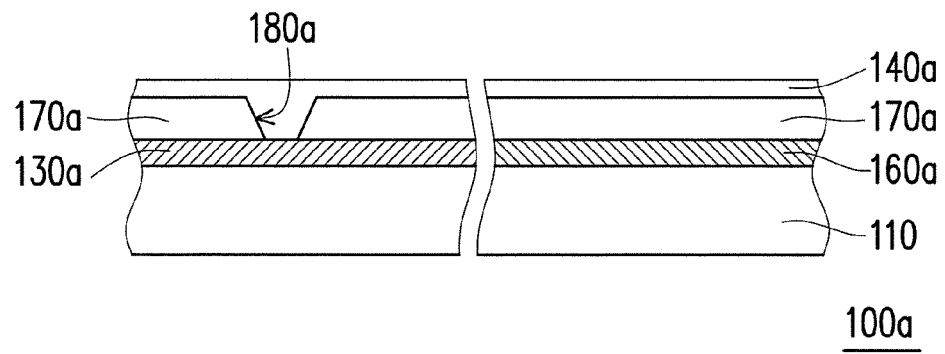
FIG. 5 is a cross-sectional view along B-B' line in FIG. 4.

FIG. 4 is a schematic view illustrating local enlargement of a touch panel in another embodiment of the invention. FIG. 5 is a cross-sectional schematic view along B-B' line in FIG. 4. Please refer to both FIGS. 4 and 5. The embodiment in FIG. 4 is substantially similar to the embodiment in FIG. 1. They are different mainly in that, in the embodiment in FIG. 4, a second electrostatic discharge protection circuit 160a is not divided into segments. Moreover, the material and the configuration for each layer of a touch panel 100a in FIG. 4 are different from that in the embodiment in FIG. 1.

In the embodiment, the touch panel 100a further includes an insulating layer 170a covering connecting lines 130a and the second electrostatic discharge protection circuit 160a. Each extending portion 140a is disposed on the insulating layer 170a and coupled downward to the corresponding connecting line 130a via a contact window 180a within the insulating layer 170a. In addition, the connecting lines 130a and the second electrostatic discharge protection circuit 160a are formed of the same metal layer. Meanwhile, in the embodiment, the extending portion 140a and at least a portion of the touch sensing array 120 are formed of the same transparent conductive material layer such as a material layer formed of indium tin oxide (ITO) or indium zinc oxide (IZO).

In other words, in the embodiment, the connecting lines 130a and the second electrostatic discharge protection circuit 160a may be located at the same layer and formed of the same metal layer. Moreover, the extending portion 140a and at least a portion of the touch sensing array 120 are located at the same layer and formed of the same transparent conductive material layer. Besides, the insulating layer 170a is located between the layers where the connecting lines 130a and the extending portion 140a are located. A portion of the extending portion 140a extends downward and is electrically connected to the connecting lines 130a via the contact window 180a.

Figure 6:
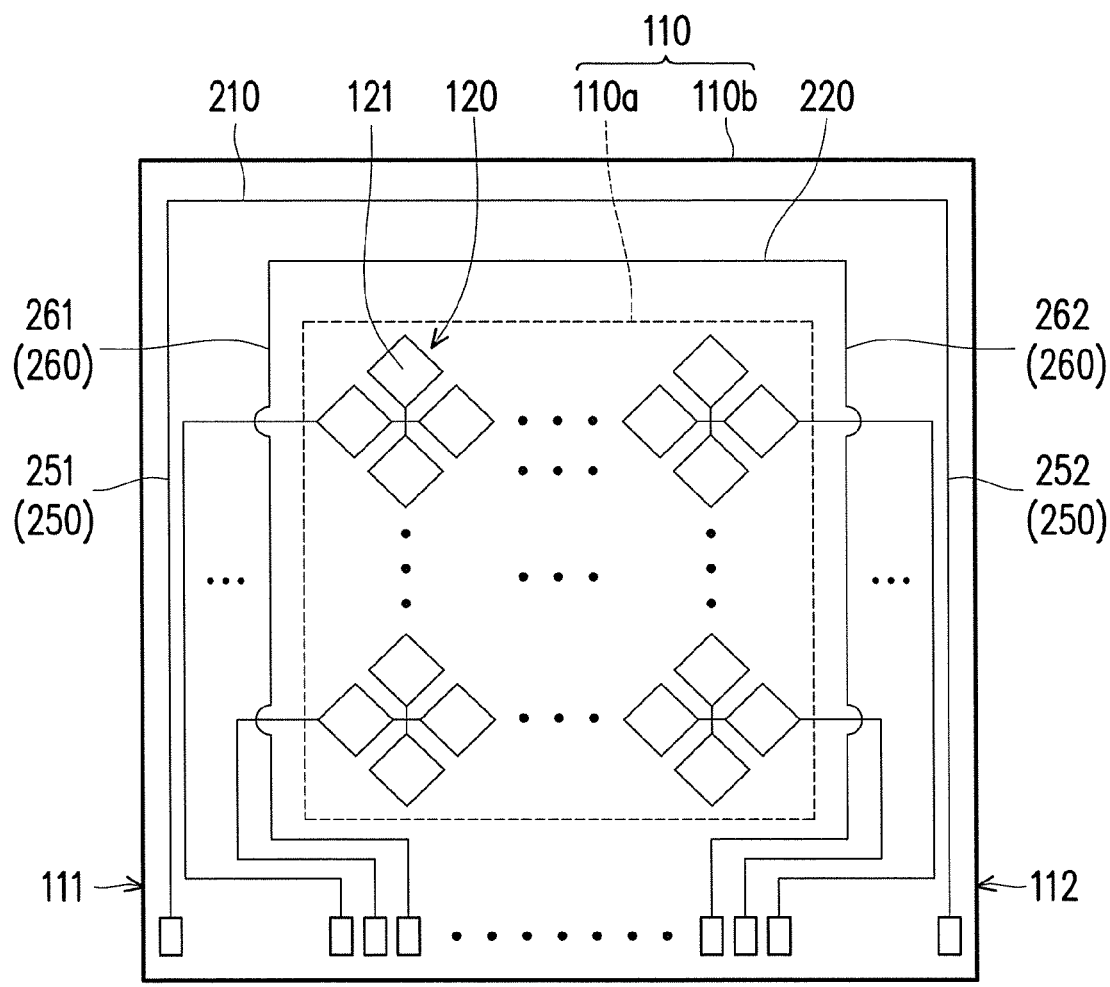
FIG. 6 is a schematic view illustrating a touch panel in another embodiment of the invention.

FIG. 6 is a schematic view illustrating a touch panel in another embodiment of the invention. Please refer to FIG. 6. The embodiment in FIG. 6 is substantially similar to the embodiment in FIG. 1. They are different mainly in that, in the embodiment in FIG. 6, the electrostatic discharge protection circuits of a touch panel 200 are electrically connected to one another. As shown in FIG. 6, the touch panel 200 further includes a first bridging line 210 and a second bridging line 220. In the embodiment, the first bridging line 210 connects an end of each of two first electrostatic discharge protection circuits 251 and 252, and the second bridging line 220 connects an end of each of two second electrostatic discharge protection circuits 261 and 262. As shown in FIG. 6, the first electrostatic discharge protection circuit 250 surrounds the outermost of the periphery region 110b of the substrate 110, and the second electrostatic discharge protection circuit 260 surrounds the innermost of the periphery region 110b of the substrate 110. In the embodiment, with the electrostatic discharge protection circuits being electrically connected to one another, the impedance of the electrostatic discharge protection circuits 250 and 260 may be reduced such that the electrostatic discharge protection is further improved.

Figure 7:
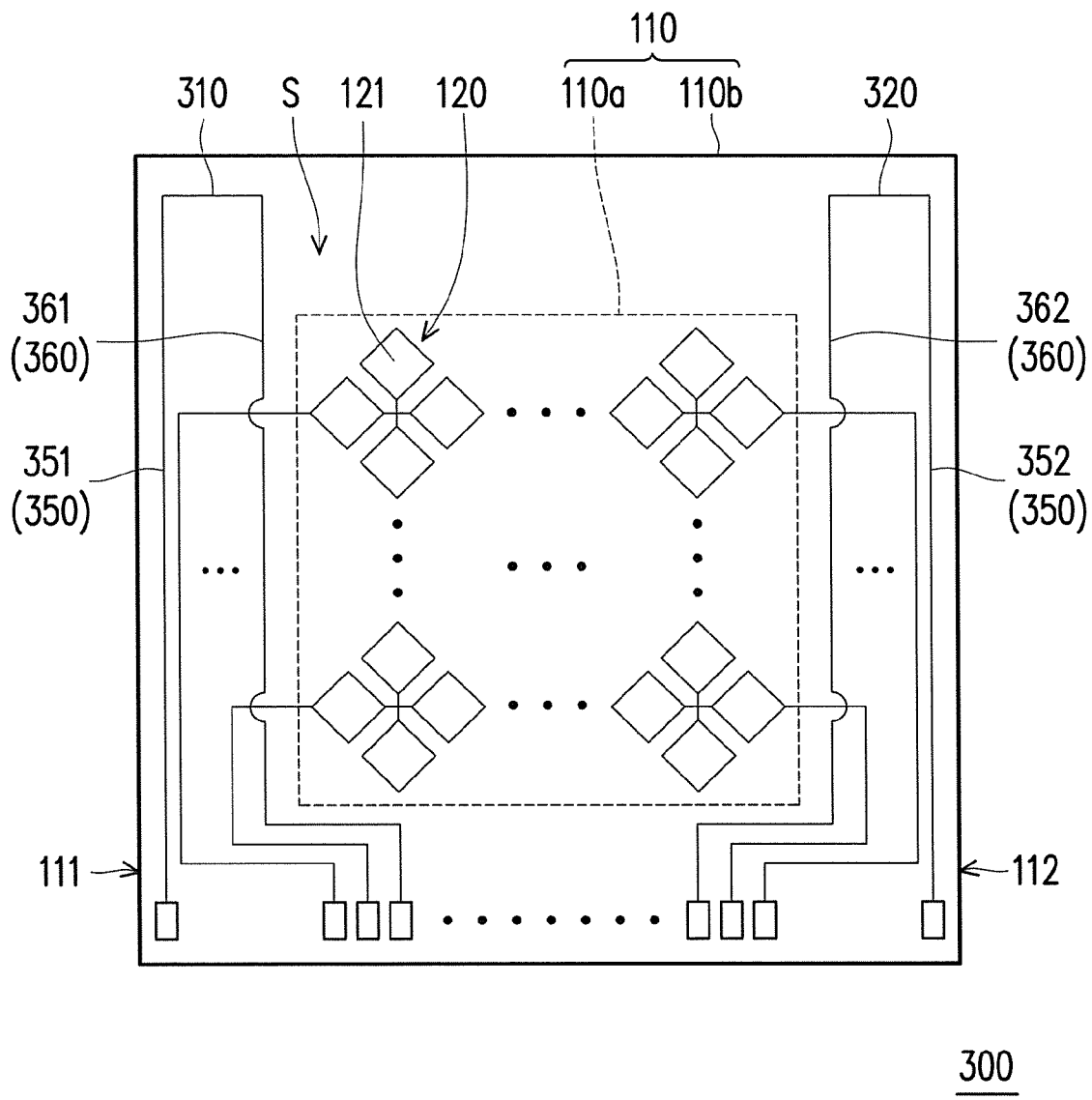
FIG. 7 is a schematic view illustrating a touch panel in another embodiment of the invention.

FIG. 7 is a schematic view illustrating a touch panel in another embodiment of the invention. Please refer to FIG. 7. The embodiment in FIG. 7 is substantially similar to the embodiment in FIG. 6. They are different mainly in that the electrostatic discharge protection circuits in the embodiment in FIG. 7 are electrically connected in a manner different from that in the embodiment in FIG. 6. As shown in FIG. 7, a touch panel 300 further includes a first bridging line 310 and a second bridging line 320. The first bridging line 310 connects an end of a first electrostatic discharge protection circuit 351 located at a side 111 of the substrate 110 to an end of a second electrostatic discharge protection circuit 361 located at the side 111. The second bridging line 320 connects an end of a first electrostatic discharge protection circuit 352 located at the other side 112 of the substrate 110 to an end of a second electrostatic discharge protection circuit 362 located at the side 112. In the embodiment, the first electrostatic discharge protection circuit 351 is electrically connected to the second electrostatic discharge protection circuit 361, and the first electrostatic discharge protection circuit 352 is electrically connected to the second electrostatic discharge protection circuit 362, thereby adjusting the electrostatic discharge protection for the touch panel 300, such as reducing the impedance. Additionally, with such connecting manner, the second electrostatic discharge protection circuit 361 and the second electrostatic discharge protection circuit 362 have a configuration space S in between. Meanwhile, other elements of the touch panel 300 may be disposed in the configuration space S.

Based on the above, in the application, the touch panel includes two electrostatic discharge protection circuits. With the design of two electrostatic discharge protection circuits, the width of each electrostatic discharge protection circuit is respectively decreased such that the border size of the touch panel is effectively reduced while the electrostatic discharge protection for the touch panel is maintained. In addition, the application further allows one of the second electrostatic discharge protection circuits to overlap with the extending portions on the substrate so that the space initially taken by the extending portions on the substrate can be effectively used. Moreover, one of the two electrostatic discharge protection circuits of the touch panel may be electrically connected to the other electrostatic discharge protection circuit to enhance the electrostatic discharge protection for the touch panel. Also, the relative position of the layer where the connecting lines, electrostatic discharge protection circuit, and the extending portions of the touch panel are located at may vary depending on different materials, allowing greater flexibility for the design of the touch panel.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. A touch panel, comprising:
    a substrate, having an active region and a periphery region;
    a touch sensing array, disposed within the active region;
    a plurality of connecting lines, disposed within the periphery region;
    a plurality of extending portions, disposed within the periphery region, and an end of each of the connecting lines being connected to the touch sensing array via the corresponding extending portion;
    a first electrostatic discharge protection circuit, disposed within the periphery region and located between the outermost connecting line and an edge of the corresponding substrate; and
    a second electrostatic discharge protection circuit, disposed within the periphery region and located between the innermost connecting line and the touch sensing array, wherein the second electrostatic discharge protection circuit overlaps with the extending portions on the substrate.

2. The touch panel according to claim 1, wherein the second electrostatic discharge protection circuit includes a first segment, a second segment, and a third segment located between the first segment and the second segment, and the touch panel further comprises an insulating layer covering the connecting lines, the first segment and the second segment of the second electrostatic discharge protection circuit, and the extending portions, and the third segment is disposed on the insulating layer and coupled downward to the first segment and the second segment via two contact windows within the insulating layer.

3. The touch panel according to claim 2, wherein the connecting lines, the first segment and the second segment of the second electrostatic discharge protection circuit, and the extending portions are formed of an identical metal layer.

4. The touch panel according to claim 2, wherein the third segment and at least a portion of the touch sensing array are formed of an identical transparent conductive material layer.

5. The touch panel according to claim 1, further comprising an insulating layer covering the connecting lines and the second electrostatic discharge protection circuit, each of the extending portions being disposed on the insulating layer and coupled downward to the corresponding connecting line via a contact window within the insulating layer.

6. The touch panel according to claim 5, wherein the connecting lines and the second electrostatic discharge protection circuit are formed of an identical metal layer.

7. The touch panel according to claim 5, wherein the extending portions and at least a portion of the touch sensing array are formed of an identical transparent conductive material layer.

8. The touch panel according to claim 1, wherein the first electrostatic discharge protection circuit comprises two first electrostatic discharge protection circuits located at two opposite sides of the substrate, and the second electrostatic discharge protection circuit comprises two second electrostatic discharge protection circuits located at two opposite sides of the active region.

9. The touch panel according to claim 8, further comprising:
    a first bridging line, connecting an end of each of the two first electrostatic discharge protection circuits; and
    a second bridging line, connecting an end of each of the two second electrostatic discharge protection circuits.

10. The touch panel according to claim 8, further comprising:
    a first bridging line, connecting an end of the first electrostatic discharge protection circuit and an end of the second electrostatic discharge protection circuit located at the same side of the substrate with the first electrostatic discharge protection circuit; and a second bridging line, connecting an end of the other first electrostatic discharge protection circuit and an end of the other second electrostatic discharge protection circuit located at the other side of the substrate with the other first electrostatic discharge protection circuit.

\* \* \* \* \*